United States Patent
Thet et al.

(10) Patent No.: US 10,263,550 B2
(45) Date of Patent: Apr. 16, 2019

(54) GAS TURBINE POWER GENERATION SYSTEM AND CONTROL SYSTEM USED IN THE SAME

(71) Applicant: Hitachi, Ltd., Chiyoda-ku, Tokyo (JP)

(72) Inventors: Aung Ko Thet, Tokyo (JP); Noriaki Hino, Tokyo (JP); Naohiro Kusumi, Tokyo (JP); Tomofumi Shiraishi, Tokyo (JP); Masatoshi Yoshimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 121 days.

(21) Appl. No.: 15/535,488

(22) PCT Filed: Dec. 19, 2014

(86) PCT No.: PCT/JP2014/084745
§ 371 (c)(1),
(2) Date: Jun. 13, 2017

(87) PCT Pub. No.: WO2016/098266
PCT Pub. Date: Jun. 23, 2016

(65) Prior Publication Data
US 2017/0346427 A1    Nov. 30, 2017

(51) Int. Cl.
*H02P 9/00* (2006.01)
*F02C 3/10* (2006.01)
(Continued)

(52) U.S. Cl.
CPC ............. *H02P 9/006* (2013.01); *F01D 15/10* (2013.01); *F02C 3/10* (2013.01); *H02P 9/04* (2013.01);
(Continued)

(58) Field of Classification Search
CPC .. H02P 9/006; H02P 9/04; F01D 15/10; F02C 3/10
See application file for complete search history.

(56) References Cited

U.S. PATENT DOCUMENTS

2005/0056021 A1* 3/2005 Belokon ............... F02C 3/113
60/772
2007/0137216 A1   6/2007 Joshi et al.
(Continued)

FOREIGN PATENT DOCUMENTS

JP    2007-505261 A    3/2007
JP    2007-170391 A    7/2007
(Continued)

OTHER PUBLICATIONS

International Search Report (PCT/ISA/210) issued in PCT Application No. PCT/JP2014/084745 dated Apr. 21, 2015 (three (3) pages).
(Continued)

*Primary Examiner* — Viet P Nguyen
(74) *Attorney, Agent, or Firm* — Crowell & Moring LLP (57) ABSTRACT

A gas turbine power generation system having an improved function to stabilize the power system is disclosed. The gas turbine power generation system has a dual-shaft gas turbine, an electric generator mechanically connected to a low pressure turbine of the dual-shaft gas turbine and electrically connected to an electric power system, a rotary electric machine mechanically connected to a high pressure turbine through a compressor of the dual-shaft gas turbine and electrically connected to the electric power system, wherein a power oscillation is suppressed by operation of the rotary electric machine as a motor or as a generator.

9 Claims, 6 Drawing Sheets (51) Int. Cl.
*F01D 15/10* (2006.01)
*H02P 9/04* (2006.01)
*H02P 101/25* (2016.01)

(52) U.S. Cl.
CPC ...... *F05D 2220/32* (2013.01); *F05D 2220/76* (2013.01); *F05D 2240/60* (2013.01); *F05D 2260/15* (2013.01); *H02P 2101/25* (2015.01); *Y02E 20/14* (2013.01)

(56) References Cited

U.S. PATENT DOCUMENTS

| | | | |
|---|---|---|---|
| 2010/0259102 A1* | 10/2010 | Guelbenzu Michelena | ................ F03D 9/00 307/65 |
| 2010/0264655 A1 | 10/2010 | Rosson et al. | |
| 2013/0234680 A1 | 9/2013 | Kolwalkar et al. | |
| 2014/0159365 A1* | 6/2014 | Algrain | ............ H02J 3/32 290/7 |
| 2015/0171705 A1* | 6/2015 | Hino | ........................ F01D 15/10 290/1 A |
| 2015/0381089 A1* | 12/2015 | Tarnowski | ................ H02J 3/24 307/84 |
| 2016/0041567 A1* | 2/2016 | Ko Thet | .................... H02P 9/42 290/7 |
| 2016/0105078 A1* | 4/2016 | Santini | ...................... F02C 7/36 290/52 |
| 2016/0356171 A1* | 12/2016 | Thet | ........................ F01D 15/10 |

FOREIGN PATENT DOCUMENTS

| | | |
|---|---|---|
| JP | 2010-249134 A | 11/2010 |
| WO | WO 2014/020772 A1 | 2/2014 |

OTHER PUBLICATIONS

Written Opinion (PCT/ISA/237) issued in PCT Application No. PCT/JP2014/084745 dated Apr. 21, 2015 (four (4) pages).

* cited by examiner

GAS TURBINE POWER GENERATION SYSTEM AND CONTROL SYSTEM USED IN THE SAME

TECHNICAL FIELD

The present invention relates to a gas turbine power generation system and a control system used in the gas turbine power generation system, which contribute stability of an electric power system.

BACKGROUND ART

Nowadays, distributed power supply systems provided in areas near regions consuming electric powers are increased. The distributed power supply systems are a power generation system from a renewable energy resource such as solar power or wind power and a gas turbine power generation system, etc.

The gas turbine power generation system has a small size and it is operated in high efficiency. A related prior art is disclosed by WO2014/020772A1 (Patent Literature 1). The Patent Literature 1 describes that a dual-shaft gas turbine power generation system includes an electric motor connected to a shaft of a compressor and a frequency converter, which drives the motor, connected between the motor and a synchronous power generator connected to a shaft of a low pressure turbine. An air-flow to a burner is controlled by a rotation of the compressor assisted by the motor for variation in an outside air temperature. Consequently, the gas turbine is continuously operated in high efficiency without reducing fuel burned in the burner.

The distributed power supply systems connected to a power system supply their surplus power to the power system. As an electricity generation from the distributed power supply systems has variable nature, the distributed power supply systems connected to the power system cause a power fluctuation such as power oscillation in the power system. Particularly, a recent increase of the power generation systems from the renewable energy resources results a large power fluctuation. Thus, a function to stabilize the power system is necessary for the distributed power supply systems connected to the power system.

Stability of the power system can be improved by use of a Power System Stabilizer (PSS) which adjusts a setting value of an Automatic Voltage Regulator (AVR) in generator in order to damp power oscillation or power perturbation. A prior art in this technical field is disclosed by US2013/0234680A1 (Patent Literature 2). The Patent Literature 2 describes that a method of damping power oscillation in the power system includes generating synchronized generator speed signals by time stamping a plurality of generator speed signals. The synchronized speed signals are transmitted to a control station for determining the power oscillation in the power system. The control station provides damping control signals to a plurality of damping devices based on the power oscillation in the power system.

CITATION LIST

Patent Literature

Patent Literature 1: WO2014/020772A1
Patent Literature 2: US2013/0234680A1

SUMMARY OF INVENTION

Technical Problem

A performance of the prior art depends on a capability of the generator, such as a power factor and a thermal limit of a winding in a field and an armature, as an excitation of the generator is controlled with the prior art. Therefore, a capability of damping the power oscillation in the power system is low, even if the prior art is applied to the gas turbine power generation system. Further, the efficiency of the gas turbine power generation system is deteriorated.

Accordingly, it is an object of the invention to provide a gas turbine power generation system having an improved function to stabilize the power system and a control system used in the gas turbine power generation system.

Solution to Problem

In order to solve the above mentioned problem, a gas turbine power generation system according to the present invention has a dual-shaft gas turbine, an electric generator mechanically connected to a low pressure turbine of the dual-shaft gas turbine and electrically connected to an electric power system, a rotary electric machine mechanically connected to a high pressure turbine through a compressor of the dual-shaft gas turbine and electrically connected to the electric power system, wherein a power oscillation is suppressed by operation of the rotary electric machine as a motor or as a generator. Additionally, a control system according to the present invention, which is used in a gas turbine power generation system having a dual-shaft gas turbine; an electric generator mechanically connected to a low pressure turbine of the dual-shaft gas turbine and electrically connected to an electric power system; a rotary electric machine mechanically connected to a high pressure turbine through a compressor of the dual-shaft gas turbine and electrically connected to the electric power system, and a frequency converter electrically connected between the rotary electric machine and the electric power system, has means for controlling the frequency converter to adjust a power including an active power and a reactive power output from the frequency converter for suppression of a power oscillation.

Advantageous Effects of Invention

A gas turbine power generation system and a control system according to the present invention result that the gas turbine power generation system has an improved function to stabilize the power system.

Other objects, features and advantages of the invention will appear from the following description with the accompanying drawings.

DESCRIPTION OF EMBODIMENTS

Preferred embodiments of the present invention directing to a gas turbine power generation system will be described.

Example 1

Figure 1:
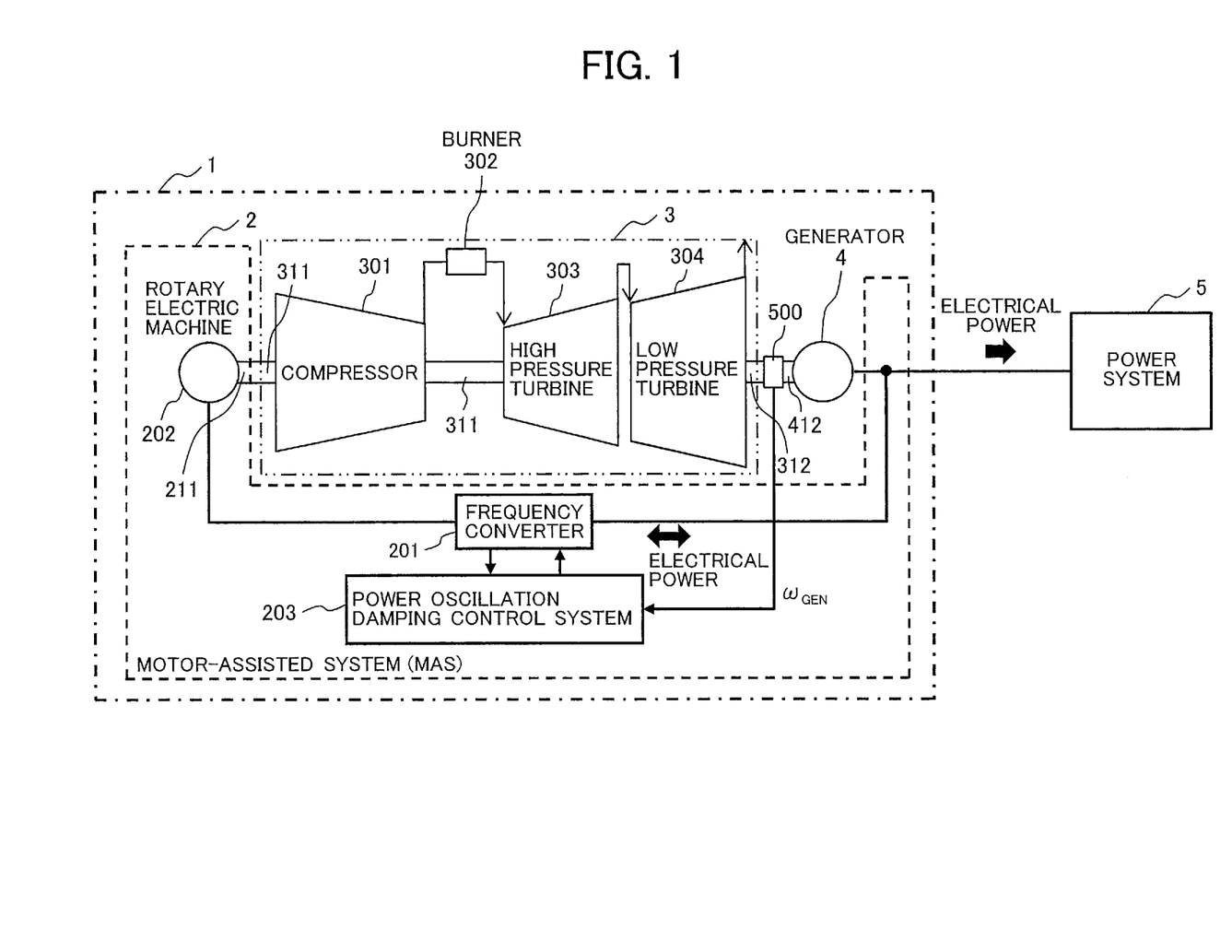
FIG. 1 illustrates an outline of a gas turbine power generation system as Example 1 according to the present invention.

FIG. 1 illustrates an outline of a gas turbine power generation system as Example 1 according to the present invention.

The gas turbine power generation system [1] has a motor-assisted system (MAS) [2] to adjust an electric power for a power system [5] by a rotary electric machine [202] consuming or generating an electric power, a dual-shaft gas turbine [3] and a generator [4], which outputs an electric power to the power system [5], rotating by the dual-shaft gas turbine [3].

The dual-shaft gas turbine [3] has a compressor [301], a burner [302] to make a high-temperature and high-pressure gas with burning a fuel mixing with an air compressed by the compressor [301], a high pressure turbine [303] rotating by the high-temperature and high-pressure gas, a first rotating shaft [311] connecting mechanically the high pressure turbine [303] to the compressor [301] and a low pressure turbine [304], which has a second rotating shaft [312] coupling with a rotating shaft [412] of the generator [4], rotating at a speed for frequency of the power system [5] by a gas discharged from the high pressure turbine [301].

This gas turbine power generation system [1] is connected electrically to the power system [5] to supply an electrical power for the power system [5]. The electrical power is supplied mainly by the generator [4]. Additionally, the electrical power is adjusted partly by the motor-assisted system [2]. The motor-assisted system [2] includes the rotary electric machine [202] of which a rotating shaft [211] couples with the first rotating shaft [311], a frequency converter [201], which is connected electrically between the rotary electric machine [202] and an electrical output of the generator [4], to operate the rotary electric machine [202] as a variable-speed motor or a generator, and a power oscillation damping control system [203] controlling the frequency converter [202] to damp a power oscillation occurring between power systems or between generators. Any kind of AC rotary electric machines such as a synchronous machine and an induction machine are applied to the rotary electric machine [202].

An electrical energy can be transformed into a mechanical energy by the rotary electric machine [202] and this mechanical energy can be transported to the compressor [301] in the dual-shaft gas turbine [3], when the rotary electric machine [202] operates as the variable-speed motor by the frequency converter [201]. On the other hand, the mechanical energy from the compressor [301] can be transformed into the electrical energy by the rotary electric machine [202] and this electrical energy can be transported to the power system [5], when the rotary electric machine [202] operates as the generator by the frequency converter [201]. These operations of the motor-assisted system [2] including the rotary electric machine [202] adjust the electric power including an active power and a reactive power for the power system [5] so as to increase a power capability of gas turbine power generation system and to improve an active power response of it for voltage and frequency stability of the power system, as described in detail later.

Figure 2:
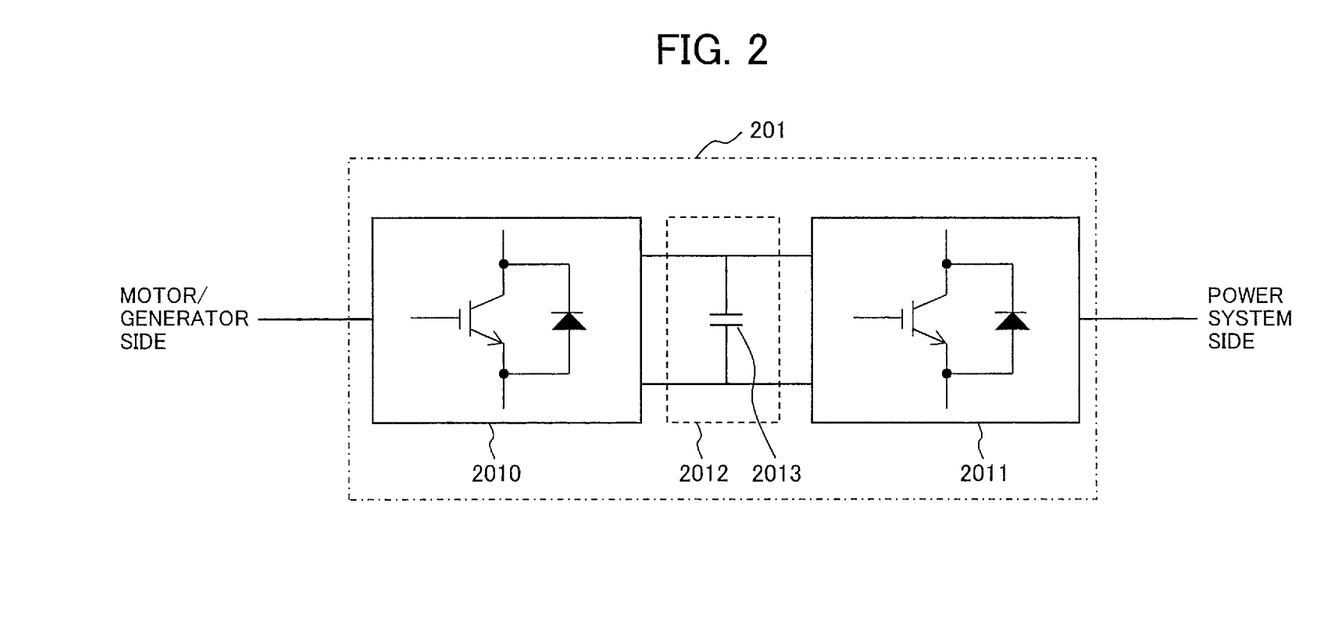
FIG. 2 illustrates an example of a circuit configuration of the frequency converter.

FIG. 2 illustrates an example of a circuit configuration of the frequency converter [201] in FIG. 1. The frequency converter [201] is so-called "BTB (back to back)". One of power conversion circuits [2010, 2011] such as three-phase bridge circuits is connected in series to the other of them through a DC link circuit [2012] having a smoothing capacitor [2013].

When the rotary electric machine [202] operates as a variable-speed motor, the power conversion circuit [2010] on the rotary electric machine side operates as an inverter converting a DC power of the DC link circuit [2012] to an AC power supplied to the rotary electric machine [202], and the power conversion circuit [2011] on the power system side operates as a converter converting an AC power of the power system side to the DC power of the DC link circuit [2012]. When the rotary electric machine [202] operates as a generator, the power conversion circuit [2010] on the rotary electric machine side operates as an converter converting an AC power generated by the rotary electric machine [202] to a DC power of the DC link circuit, and the power conversion circuit [2011] on the power system side operates as an inverter converting the DC power of the DC link circuit [2013] to an AC power supplied to the power system side.

Additionally, power semiconductor switching devices such as IGBTs (Insulated Gate Bipolar Transistors) in the power conversion circuits [2010, 2011] are controlled with PWM (Pulse Width Modulation). The PWM signals to the power semiconductor switching devices are generated under a control of the power oscillation damping control system [203] for suppression of the power oscillation. Consequently, the rotary electric machine [202] can operate as a variable speed motor and it can operate as a generator supplying an electric power on a frequency of the power system [5] to the power system side. In this manner, the motor-assisted system [2] can adjust the electric power for the power system [5] by the rotary electric machine [202] consuming or generating an electric power.

Gate Turn Off Thyristors (GTOs) and Power MOSFETs can be applied as the power semiconductor switching devices instead of the IGBTs.

Figure 3:
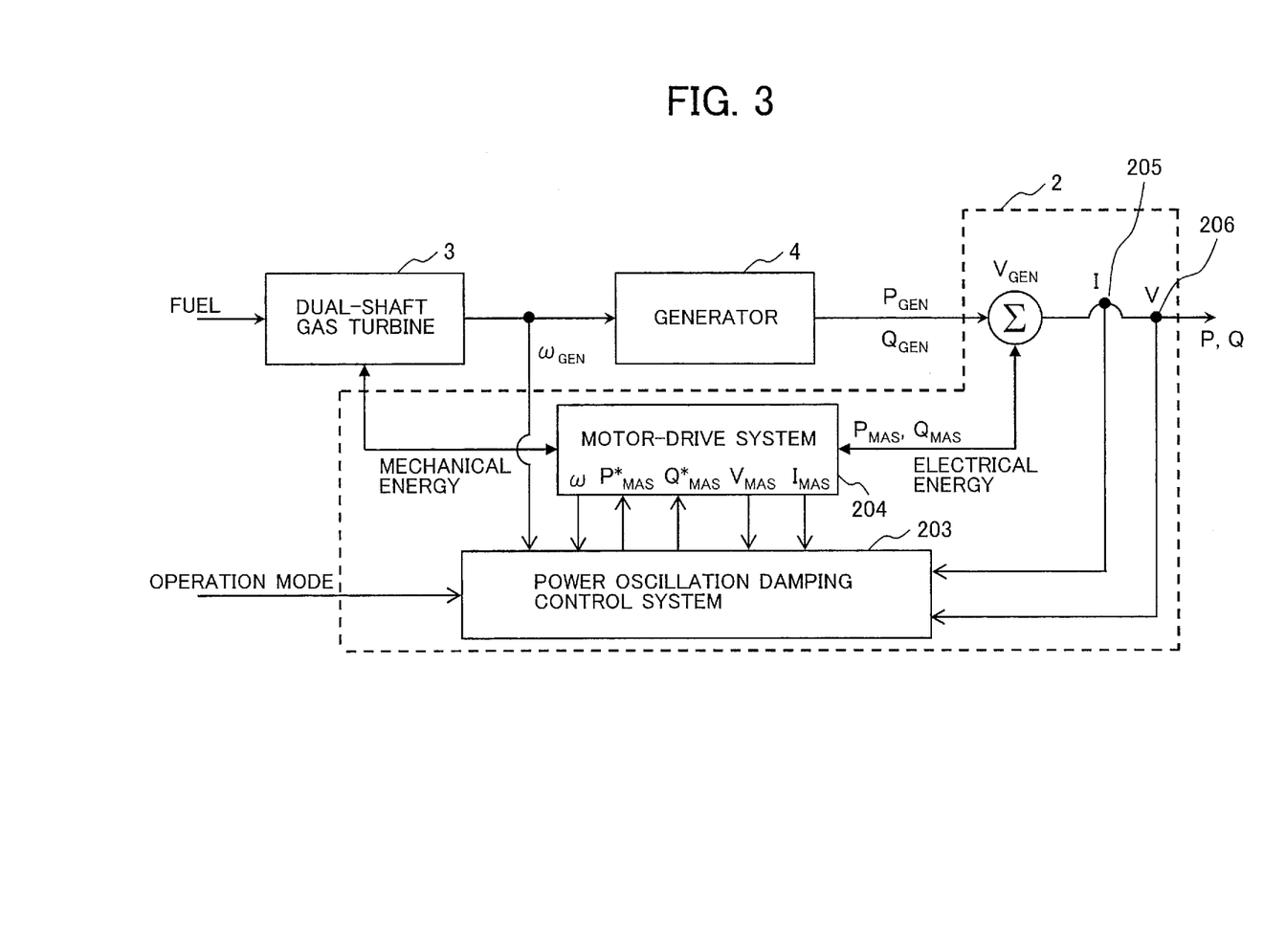
FIG. 3 illustrates a block diagram of the gas turbine power generation system.

FIG. 3 illustrates a block diagram of the gas turbine power generation system [1]. The dual-shaft gas turbine [3] converts a heat energy of high-temperature and high-pressure gas generated with burning a fuel to a mechanical energy for driving the generator [4]. The generator [4] converts the mechanical energy from the dual-shaft gas turbine to an electric power.

Incidentally, modern power system dynamics is characterized by oscillatory behavior as a result of variety disturbances such as changes in load, fluctuated power generation from renewable energy sources, tripping of lines, faults and other similar events. For damping the power oscillation in power systems and generator's rotor, active and reactive power generation is controlled. However, active and reactive power capability of a generator is limited at a specified voltage, thermal limits for a field and an armature, and power factor (usually 0.85 or 0.9 lagging). Generally, with balanced design, the thermal limits for the field and armature intersect at a point that represents the generator rated (nameplate) MVA and power factor rating in a P-Q plane.

A conventional automatic voltage regulator (AVR) of generator is used to control a generator terminal voltage by adjusting excitation voltage of generator and consequence, the reactive power output of generator is also controlled. Therefore, it is desirable that a control system design of AVR meets the above mentioned limitations.

One of conventional approaches for damping the power oscillation in the power system and oscillation of generator's rotor is the use of PSS (Power System Stabilizer) which adds an extra control reference signal to the AVR in order to adjust excitation voltage of generator. As the adjustment of excitation voltage of generator will also adjust the reactive power output of generator, an electromechanical dynamics behavior of the generator is improved with compensation of the power oscillation in the power system. As the oscillatory behavior is mainly concerned with electromechanical dynamics, it is desirable that the operational limit of active and reactive power is considered. The active power output is limited by the prime mover capability to transform mechanical energy within the MVA rating. The existence of dead time characteristic in speed changer of governor and turbine limits the instantaneous response to output active power to smoothen the fluctuation in power systems.

The above limits on active and reactive power output are imposed by the capabilities of the generator itself and are determined by the design of the generator. Additional limits may be imposed by the power systems operator to maintain power system's stability.

To overcome the above mentioned limitations, the motor-assisted system (MAS) [2] is applied in this embodiment.

In FIG. 3, a motor-drive system [204] in the motor-assisted system [2] includes the rotary electric machine [202] and the frequency converter shown in FIGS. 1 and 2. The frequency converter [201] in the motor drive system [204] has a capability to control a reactive power $Q_{MAS}$ and an active power $P_{MAS}$ of the motor-assisted system [2] on the power system [5] side, independently, with using active power reference $P^*_{MAS}$ and reactive power reference $Q^*_{MAS}$ output by the power oscillation damping control system [203]. The power oscillation damping control system [203] calculates these references $P^*_{MAS}$, $Q^*_{MAS}$ for the frequency converter [201] based on a current I detected by a current sensor [205] and a voltage V detected by a voltage sensor [206] at an output of the gas turbine power generation system [1], a voltage $V_{MAS}$ and a current $I_{MAS}$ of the motor-assisted system [2] on the power system side, a speed $\omega$ of the rotary electric machine [202] detected by a position sensor such as a rotary encoder not shown in FIGS. 1 and 2, a speed $\omega_{GEN}$ of the generator [4] detected by a position sensor [500] coupled to the rotating shaft [412] of the generator [4] such as a rotary encoder and an operation mode set by other controller not shown in FIG. 3.

According to the afore-mentioned manner, the motor-drive system [204] exchanges the power between the electric power system [5] and the high pressure turbine (HPT) in the dual-shaft gas turbine [3]. Therefore, auxiliary energy flow can be controlled by operation of the rotary electric machine [202] in the motor-assisted system [2], between output of the generator [4] and HPT. As the compressor at HPT can be operated in allowable variable speed range, the kinetic energy can be stored in inertia of the compressor [301] and the fast response of active power adjustment is done by means of active power control in the motor-assisted system [2].

Moreover, the frequency converter [201] of the motor-assisted system [2] is controlled by the power oscillation damping control system [203] that controls power of frequency converter [201] in the motor-drive system [204] to adjust the active and reactive power output of gas turbine power generation system [1] for suppression of a power oscillation in an inter-system power oscillation control mode and an local power oscillation control mode. These modes are set to the power oscillation damping control system [203] as the operational mode in FIG. 3. Generally, an inter-system (inter-area) power oscillation having frequency of 0.3~0.5 Hz is generated among power systems, and a local power oscillation having frequency of 1 Hz level is generated among generators.

Figure 4:
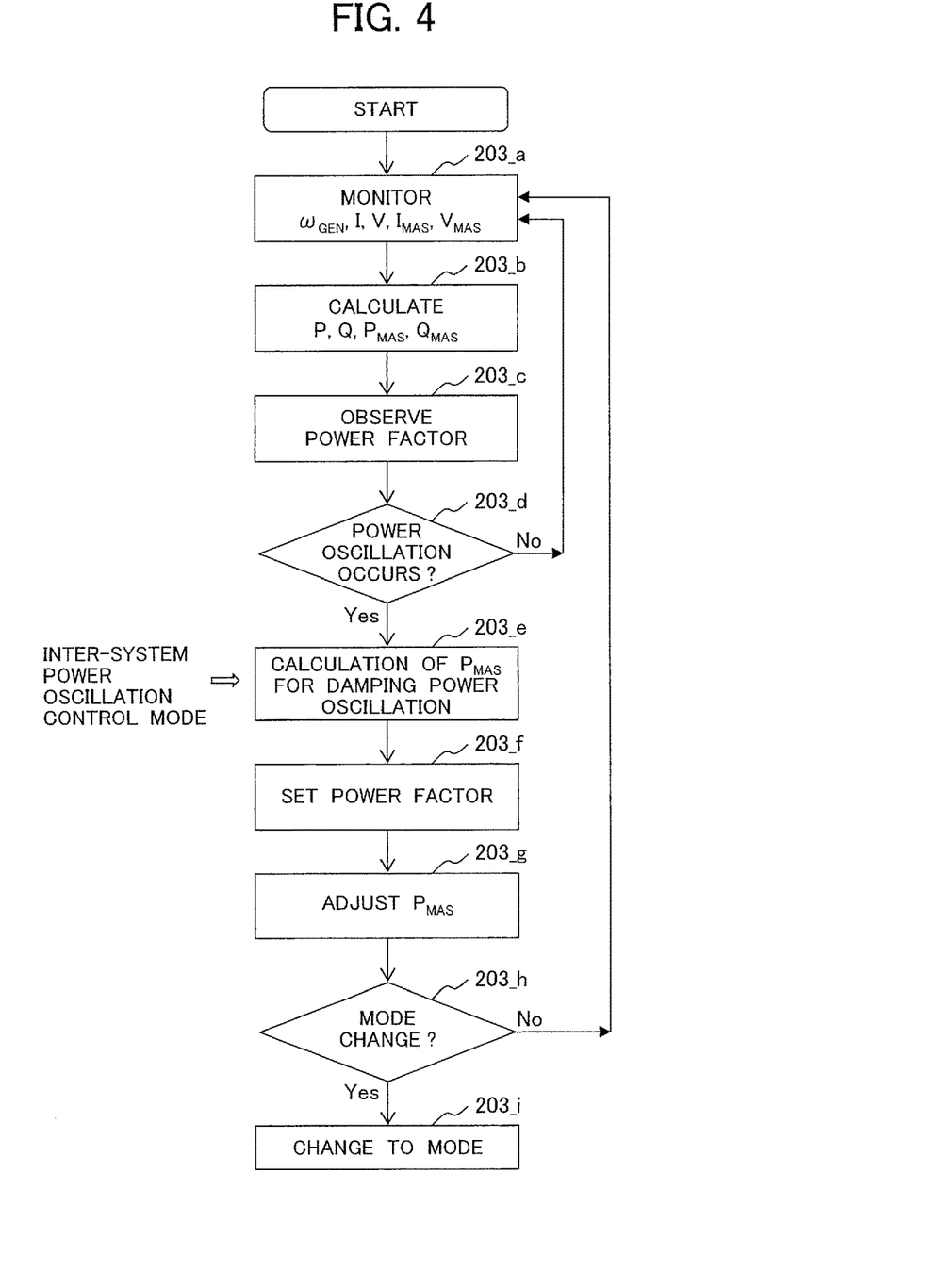
FIG. 4 illustrates a flowchart showing processes of the power oscillation damping control system for suppression of the inter-system power oscillation.

FIG. 4 illustrates a flowchart showing processes of the power oscillation damping control system in the Example 1 for suppression of the inter-system power oscillation.

The power oscillation damping control system [203] has an objective to keep the rotational speed ($\omega_{GEN}$) of generator [4] in the gas turbine power generation system [1] at constant. In this operation, the power oscillation damping control system monitors voltage (V) and current (I) of the gas turbine power generation system [1], voltage ($V_{MAS}$) and current ($I_{MAS}$) of the motor-assisted system [2] and the rotational speed ($\omega_{GEN}$) of generator [4] [203_a].

Then, active power (P) and reactive power (Q) of the gas turbine power generation system [1] are calculated on the basis of V and I, and active power ($P_{MAS}$) and reactive power ($Q_{MAS}$) of the motor assisted system [2] are calculated on the basis of $V_{MAS}$ and $I_{MAS}$ [203_b].

Then power factor cos(θ), where θ is an angle between voltage and current of the motor-assisted system [2] (MAS) are observed on the basis of ($V_{MAS}$,$I_{MAS}$) or ($P_{MAS}$,$Q_{MAS}$) [203_c].

After observing the power factor of motor-assisted system, checking power oscillation with on the basis of the monitored rotational speed ($\omega_{GEN}$) of generator [4] detected by the position sensor [500], whether a power oscillation larger than a predetermined threshold value is occurring or not [203_d]. For example, amplitude of $\omega_{GEN}$ is applied to the threshold value. Additionally, frequency component of $\omega_{GEN}$ having the frequency of the power oscillation can be applied to the threshold value. The frequency component is detected with using a filter. Moreover, system oscillation information from other controller not shown in FIGS. 1 and 3 can be applied to the threshold value instead of the amplitude and the frequency component.

If the power oscillation is not occurring [203_d; NO], the power oscillation damping control system [203] continues to monitor the voltage (V) and current (I) of the gas turbine power generation system [1], the voltage ($V_{MAS}$) and current ($I_{MAS}$) of the motor-assisted system [2] and the rotational speed ($\omega_{GEN}$) of generator [4] in step 203_a. If the power oscillation is occurring [203_d; YES] and the power oscillation damping control system is set in an inter-system power oscillation control mode, a required $P_{MAS}$ for damping the inter-system power oscillation (e.g. 0.2~0.5 Hz) is calculated by means of an index K, [203_e], represented by [MATH 1] and [MATH 2]. The [MATH 1] is derived on the basis of a so-called motion equation of the generator [4].

As shown in [MATH 1], (K×$P_{MAS}$) is calculated to compensate an acceleration power difference ($P_a$) between mechanical power and electrical power of the generator [4] to minimize a speed fluctuation (Δω) of $\omega_{GEN}$. Consequently, (K×$P_{MAS}$) is a deceleration power injected from the motor-assisted system [2] to the power system [5] to compensate the acceleration power difference (Pa). M is an inertia constant of the generator [4] and the index K is a gain of the required active power $P_{MAS}$ from the motor-assisted system [2] to suppress the speed fluctuation (Δω) so as to damp the inter-system power oscillation. The control reference which asks the active power adjustment (Δ$P_{MAS}$) of the motor-assisted system [2] from the measured output active power ($P_{MAS}$) of the motor-assisted system [2] can be calculated by [MATH 2].

$$\Delta\omega = \frac{1}{M}(P_a - (K \times P_{MAS}))$$ [MATH 1]

$$\Delta P_{MAS} = (K \times P_{MAS}) - P_{MAS}$$ [MATH 2]

Then, it is desirable that the power factor of the motor-assisted system [2] is set in order to be within the acceptable range [203_f] in order to get the best effort in maintaining the power factor of the motor-assisted system [2].

As a response of power control by the frequency converter [201] in the motor-assisted system [2] is faster than that of the generator [4], and extra active and reactive power adjustment is available, power adjustment of the active power ($P_{MAS}$) of the motor-assisted system [2] is carried out until to meet the objective corresponding to the ($K \times P_{MAS}$) or $\Delta P_{MAS}$ [203_g].

By this way, with the assistance of power adjustment by the motor-assisted system [2], the speed fluctuation ($\Delta\omega$) can be suppressed so as to damp the power oscillation between power systems. The mode of the power oscillation damping control system [203] is checked again in a step [203_h].

If the mode is not changed [203_h; NO], the processes from step [203_a] to step [203_h] are continued. If the mode is changed [203_h; YES], then the power oscillation damping control system [203] is switched to that mode [203_i].

As the above-mentioned manner, the speed fluctuation ($\Delta\omega$) of $\omega_{GEN}$ is suppressed with injecting an active power from the frequency converter [201] in the motor-assisted system [2]. Consequently, the inter-system power oscillation is rapidly suppressed.

According to the Example 1, a gas turbine power generation system can have an improved function to stabilize the power system with suppression of the inter-system power oscillation. Additionally, an oscillation of the rotating shaft [412] with the power oscillation is reduced.

Example 2

Figure 5:
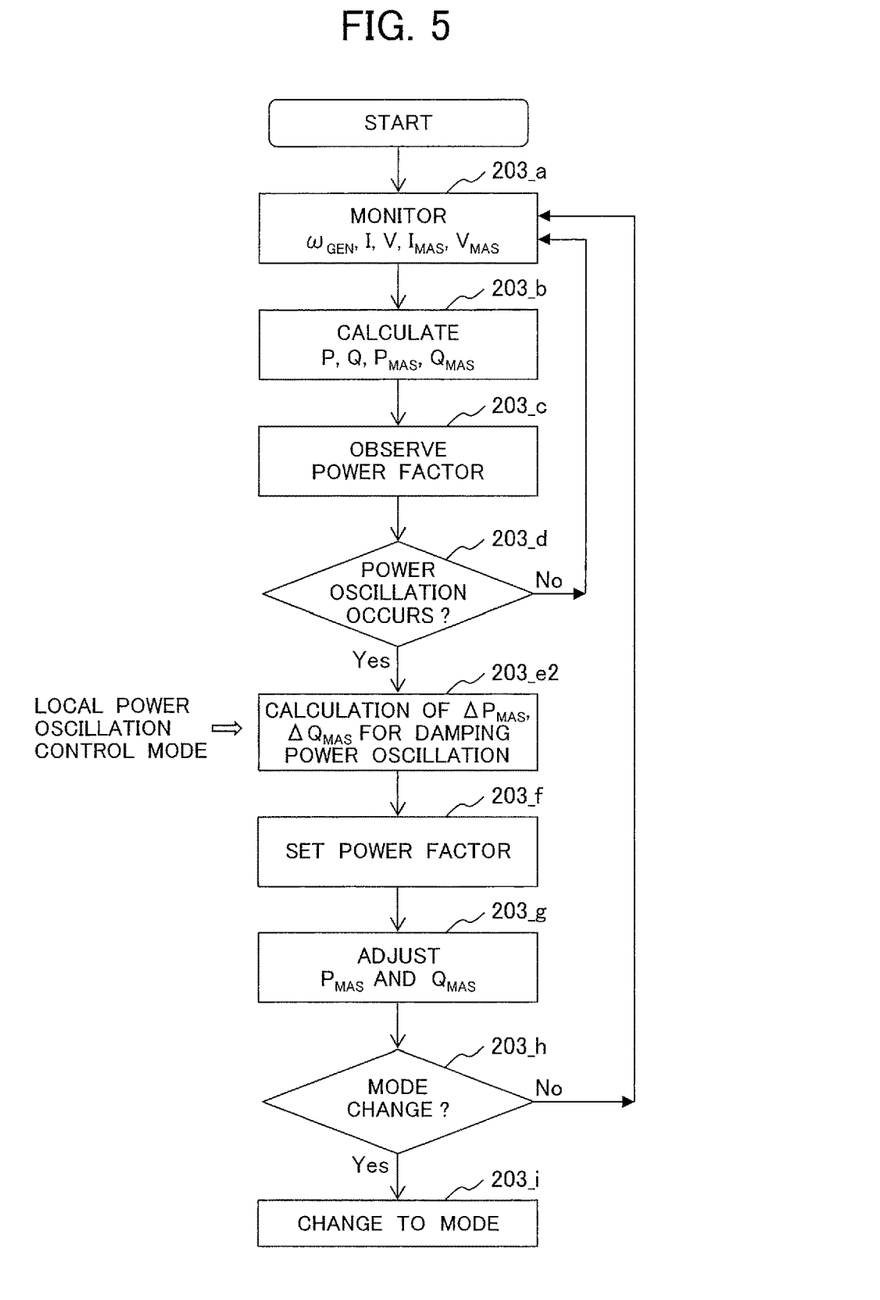
FIG. 5 illustrates a flowchart showing processes of the power oscillation damping control system in Example 2 according to the present invention.

FIG. 5 illustrates a flowchart showing processes of the power oscillation damping control system in Example 2 according to the present invention for suppression of a local power oscillation (e.g. 1.0 Hz). Additionally, a system configuration of this Example 2 is same as that of the Example 1 shown by FIGS. 1-3. Components which have the same operation as shown in the Example 1 are represented with the same numbers and so the detailed explanation of those components is skipped here. Differences between the flowcharts shown in FIGS. 4 and 5 are mainly explained, as follows.

The differences between the power oscillation damping control system of the Example 1 shown in FIG. 4 and that of the Example 2 shown in FIG. 5 are a change in the input of the operation mode in step [203_e2] and a calculation approach of the power of the motor-assisted system [2].

The power system [5] can be represented by an equivalent resistance R and a reactance X, and due to the change in active power ($\Delta P$) and the change in reactive power ($\Delta Q$) of the gas turbine power generation system [1], the voltage variation $\Delta V$ can be approximated by [MATH 3].

$$\Delta V \approx (\Delta P \times R) - (\Delta Q \times X)$$ [MATH 3]

The [MATH3] represents a well known relation between voltage variation and power variations in a power system. Moreover, the [MATH3] shows that a voltage variation due to the power oscillation can be suppressed by power variations in a power system. In the Example 2, adjusting a variation of the active power of the motor-assisted system [2] ($\Delta P_{MAS}$) and a variation of the reactive power of the motor-assisted system [2] ($\Delta Q_{MAS}$) causes a change of $_\Delta P$ in P and a change of $_\Delta Q$ in Q respectively in order to suppress the voltage variation due to the local power oscillation between the power system [5] and the generator [4]. Consequently, the power oscillation damping control system [203] controls the frequency converter [201] to output the active and reactive powers $P_{MAS}$, $Q_{MAS}$ for the suppression of the local power oscillation. As a result, fast fluctuation of active power of the gas turbine power generation system [1] can be controlled to suppress the local power oscillation by keeping the best balance of $P_{MAS}$ and $Q_{MAS}$.

According to the Example 2, a gas turbine power generation system can have an improved function to stabilize the power system with suppression of the local power oscillation.

Example 3

Figure 6:
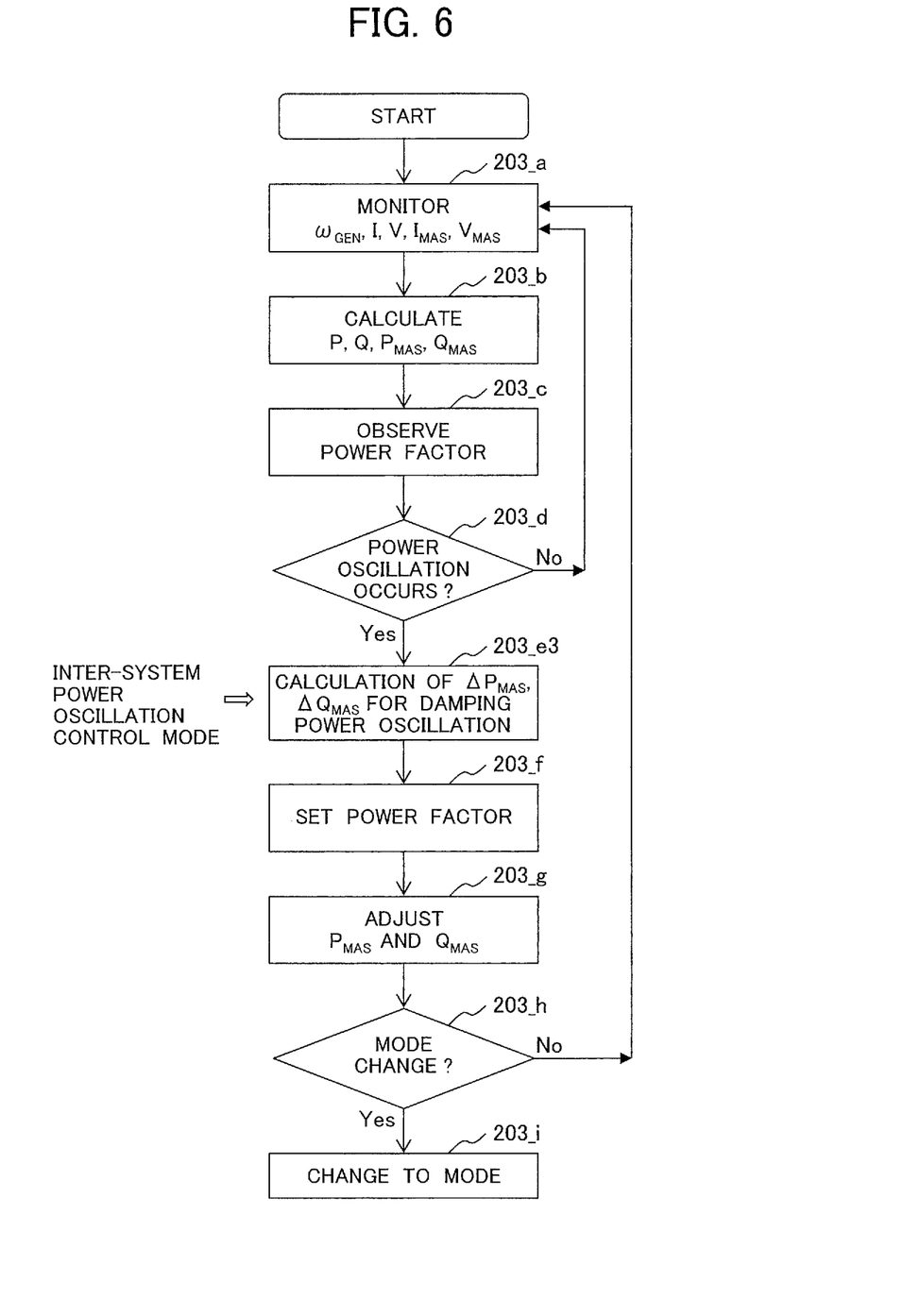
FIG. 6 illustrates a flowchart showing processes of the power oscillation damping control system in Example 3 according to the present invention.

FIG. 6 illustrates a flowchart showing processes of the power oscillation damping control system in Example 3 according to the present invention for suppression of an inter-system power oscillation. Additionally, a system configuration of this embodiment is same as that of the Example 1 shown by FIGS. 1-3. Components which have the same operation as shown in the Example 1 are represented with the same numbers and so the detailed explanation of those components is skipped here. Differences between the flowcharts shown in FIGS. 4 and 6 are mainly explained, as follows.

The differences between the power oscillation damping control system of the Example 1 shown in FIG. 4 and that of the Example 3 shown in FIG. 6 is a calculation approach of the powers of the motor-assisted system [2] in step [203_e3] for setting power factor. If the location of the gas turbine power generation system [1] in the power system influences an inter-system power flow, by setting a power factor, both active and reactive power control of the motor-assisted system [2] can be used to suppress the inter-system power oscillation.

In the Example 3, a variation of the active power of the motor-assisted system [2] ($\Delta P_{MAS}$) and a variation of the reactive power of the motor-assisted system [2] ($\Delta Q_{MAS}$) are calculated with the calculation approach such as the above-mentioned Example 2 [203_e3]. Moreover, the $P_{MAS}$ and $Q_{MAS}$ output by the motor-assisted system [2] are adjusted according to the calculated $\Delta P_{MAS}$ and $\Delta Q_{MAS}$ under the power factor set within the acceptable range by the step [203_f] such as the step [203_f] in FIG. 5 of the aforementioned Example 2.

According to the Example 3, a gas turbine power generation system can have an improved function to stabilize the power system with suppression of the inter-system power oscillation under an optimum power factor.

It is to be understood that the invention is not limited in its application to the details of construction and arrangement of parts illustrated in the accompanying drawings, since the invention id capable of other embodiments and of being practiced or carried out in various ways. Also it is to be understood that the phraseology or terminology employed herein is for the purpose of description and not of limitation.

For example, a rotational speed sensor can be applied instead of a position sensor such as the position sensor [500] in FIG. 1. The position sensor and the speed sensor are attached to any rotating shafts [211, 311, 312, 412] in the dual gas turbine [3], the rotary machine [202] and the generator [4]. A sensor-less technology is applied instead of the position and speed sensors. Further, the power oscillation can be detected on the basis of voltage or current of the generator or the power system.

REFERENCE SIGNS LIST 1 gas turbine power generation system (GT)
2 Motor-assisted system (MAS)
3 Dual-shaft gas turbine
4 Generator
5 Power system
201 Frequency converter
202 Rotary electric machine
203 Power oscillation damping control system
204 Motor-drive system
205 Voltage sensor
206 Current sensor
211 Rotating shaft
301 Compressor
302 Burner
303 High pressure turbine
304 Low pressure turbine
311 Rotating shaft
312 Rotating shaft
412 Rotating shaft
500 Position sensor
2010 Power conversion circuit
2011 Power conversion circuit
2012 DC link circuit
2013 Smoothing capacitor

The invention claimed is:

1. A gas turbine power generation system comprising:
a dual-shaft gas turbine;
an electric generator mechanically connected to a low pressure turbine of the dual-shaft gas turbine and electrically connected to an electric power system;
a rotary electric machine mechanically connected to a high pressure turbine through a compressor of the dual-shaft gas turbine and electrically connected to the electric power system;
wherein a power oscillation in the electric power system is suppressed by operation of the rotary electric machine as a motor or as a generator
wherein the operation of the rotary electric machine adjusts a power including an active power and a reactive power,
a frequency converter electrically connected between the rotary electric machine and the electric power system;
wherein the rotary electric machine is operated by the frequency converter,
a control system controlling the frequency converter to adjust the power including the active power and the reactive power output from the frequency converter for suppression of the power oscillation in the electric power system;
wherein the power oscillation in the electric power system includes an inter-system power oscillation, and the inter-power oscillation is a power fluctuation, having frequency of 0.3~0.5 Hz, generated among power systems,
wherein the control system is set in an inter-system power oscillation control mode for suppression of the inter-system power oscillation,
wherein the control system controls the frequency converter to adjust the active power or both of the active power and the reactive power when the control system is set in the inter-system power oscillation control mode on the basis of a voltage and a current at an output of the gas turbine power generation system and a voltage and a current of the frequency converter on a side of the electric power system.

2. A gas turbine power generation system according to claim 1, wherein the frequency converter is operated by semiconductor switching devices.

3. A gas turbine power generation system according to claim 1, wherein the active power is adjusted to suppress a speed fluctuation of the electric generator when the control system controls the frequency converter to adjust the active power in the inter-system power oscillation control mode.

4. A gas turbine power generation system according to claim 1, wherein the active power and the reactive power are adjusted under an optimum power factor when the control system controls the frequency converter to adjust both of the active power and the reactive power in the inter-system power oscillation control mode.

5. A gas turbine power generation system according to claim 1, wherein the active power and the reactive power are adjusted to suppress a voltage variation due to the inter-system power oscillation when the control system controls the frequency converter to adjust both of the active power and the reactive power in the inter-system power oscillation control mode.

6. A gas turbine power generation system according to claim 1,
wherein the power oscillation in the electric power system includes a local power oscillation, and the local power oscillation is a power fluctuation, having frequency of 1 Hz level, generated among generators,
wherein the control system is set in a local power oscillation control mode for suppression of the local power oscillation mode,
wherein the control system controls the frequency converter to adjust the active power and the reactive power when the control system is set in the local power oscillation control mode on the basis of the voltage and the current at the output of the gas turbine power generation system and the voltage and the current of the frequency converter on the side of the power system.

7. A gas turbine power generation system according to claim 6, wherein the active power and the reactive power are adjusted to suppress a voltage variation due to the local power oscillation.

8. A control system for a gas turbine power generation system which has a dual-shaft gas turbine; an electric generator mechanically connected to a low pressure turbine of the dual-shaft gas turbine and electrically connected to an electric power system; a rotary electric machine mechanically connected to a high pressure turbine through a compressor of the dual-shaft gas turbine and electrically connected to the electric power system, and a frequency converter electrically connected between the rotary electric machine and the electric power system, comprising:
means for controlling the frequency converter to adjust a power including an active power and a reactive power output from the frequency converter for suppression of a power oscillation in the electric power system, wherein the power oscillation includes an inter-system power oscillation, and the inter-system power oscillation is a power fluctuation, having frequency of 0.3~0.5 Hz, generated among power systems, wherein the control system is set in an inter-system power oscillation control mode for suppression of the inter-system power oscillation, wherein the control system controls the frequency converter to adjust the active power or both of the active power and the reactive power when the control system is set in the inter-system power oscillation control mode on the basis of a voltage and a current at an output of the gas turbine power generation system and a voltage and a current of the frequency converter on a side of the electric power system.

9. A control system for a gas turbine power generation system according to claim 8, wherein the power oscillation in the electric power system includes a local power oscillation, and the local power oscillation is a power fluctuation, having frequency of 1 Hz level, generated among generators, wherein the control system is set in a local power oscillation control mode for suppression of the local power oscillation mode, wherein the control system controls the frequency converter to adjust the active power and the reactive power when the control system is set in the local power oscillation control mode on the basis of the voltage and the current at the output of the gas turbine power generation system and the voltage and the current of the frequency converter on the side of the electric power system.

* * * * *